US009180929B2

(12) United States Patent
Florczyk et al.

(10) Patent No.: US 9,180,929 B2
(45) Date of Patent: Nov. 10, 2015

(54) SPROCKET ASSEMBLY

(71) Applicant: SRAM Deutschland GmbH, Schweinfurt (DE)

(72) Inventors: Raymond Florczyk, Stammheim (DE); Philipp Holle, Schweinfurt (DE)

(73) Assignee: SRAM DEUTSCHLAND GmbH, Schweinfurt (DE)

(*) Notice: Subject to any disclaimer, the term of this patent is extended or adjusted under 35 U.S.C. 154(b) by 38 days.

(21) Appl. No.: 14/047,075

(22) Filed: Oct. 7, 2013

(65) Prior Publication Data

US 2014/0179474 A1 Jun. 26, 2014

(30) Foreign Application Priority Data

Oct. 12, 2012 (DE) ......................... 10 2012 020 563

(51) Int. Cl.

*F16H 55/12* (2006.01)
*F16H 55/30* (2006.01)
*B62M 9/10* (2006.01)

(52) U.S. Cl.

CPC . *B62M 9/10* (2013.01); *F16H 55/30* (2013.01)

(58) Field of Classification Search

CPC ......... B62M 9/10; B62M 9/105; F16H 55/30; F16H 7/06; F16D 41/30
USPC .......................................................... 474/160
See application file for complete search history.

(56) References Cited

U.S. PATENT DOCUMENTS

| | | | | |
|---|---|---|---|---|
| 4,145,095 | A * | 3/1979 | Segawa | 384/545 |
| 4,472,163 | A * | 9/1984 | Bottini | 474/160 |
| 4,828,537 | A * | 5/1989 | Jourdain et al. | 474/160 |
| 4,869,710 | A * | 9/1989 | Iwasaki | 474/160 |
| 5,194,051 | A * | 3/1993 | Nagano | 474/160 |
| 5,480,357 | A * | 1/1996 | Liang | 474/77 |
| 5,503,600 | A * | 4/1996 | Berecz | 474/160 |
| 6,065,580 | A * | 5/2000 | Kirk | 192/217.3 |
| 6,264,575 | B1 * | 7/2001 | Lim et al. | 474/77 |
| 6,382,381 | B1 * | 5/2002 | Okajima et al. | 192/64 |
| 6,428,437 | B1 * | 8/2002 | Schlanger | 474/160 |
| 6,488,603 | B2 * | 12/2002 | Lim et al. | 474/160 |
| 6,516,931 | B2 * | 2/2003 | Kroger | 192/46 |
| 6,866,604 | B2 * | 3/2005 | Kamada et al. | 474/160 |
| 7,011,592 | B2 * | 3/2006 | Shahana et al. | 474/160 |
| 7,351,171 | B2 * | 4/2008 | Kanehisa et al. | 474/160 |
| 7,931,553 | B2 * | 4/2011 | Tokuyama | 474/160 |
| 8,641,151 | B2 * | 2/2014 | Kamada | 301/110.5 |
| 2002/0020984 | A1 * | 2/2002 | Dunkley | 280/215 |

(Continued)

FOREIGN PATENT DOCUMENTS

| | | |
|---|---|---|
| EP | 0607095 | 7/1994 |

*Primary Examiner* — Henry Liu
(74) *Attorney, Agent, or Firm* — Milan Milosevich; Lisa Serdynski

(57) ABSTRACT

The invention relates to a sprocket assembly for mounting on a driver of a rear wheel hub of a bicycle. By means of a threaded element, a sprocket cluster and a separately embodied ring element are axially clamped together, and a rotation-coupling device is provided between the sprocket cluster and the ring element. Knurled teeth features on the threaded element and ring element prevent the loosening of the threaded element. Through the separate embodiment of the ring element and sprocket cluster, the respective most suitable manufacturing methods can be used for the two parts and, in the event that the sprocket cluster is manufactured by means of machining methods, the knurled features on the ring element can also be produced in a cost-effective and precise manner through shaping methods.

9 Claims, 3 Drawing Sheets

(56) References Cited

U.S. PATENT DOCUMENTS

| | | | | |
|---|---|---|---|---|
| 2003/0064844 | A1* | 4/2003 | Lin | 474/160 |
| 2003/0171180 | A1* | 9/2003 | Shahana et al. | 474/152 |
| 2008/0004143 | A1* | 1/2008 | Kanehisa et al. | 474/160 |
| 2008/0188336 | A1* | 8/2008 | Tokuyama | 474/160 |
| 2010/0075791 | A1* | 3/2010 | Braedt | 474/160 |
| 2012/0208662 | A1* | 8/2012 | Braedt | 474/160 |
| 2012/0302384 | A1* | 11/2012 | Braedt | 474/160 |

* cited by examiner

SPROCKET ASSEMBLY

BACKGROUND OF THE INVENTION

The invention relates to a sprocket assembly for mounting of a driver on a rear wheel hub of a bicycle. The multiple sprocket assembly includes a cluster of sprockets of different sizes for engaging a chain and for transferring a force introduced by the chain to the hub, with the possibility of shifting the chain from one sprocket to another by means of a derailleur.

In some conventional multiple sprocket assemblies, a cassette or multiple sprocket cluster part with a plurality of separate sprockets with different diameters and numbers of chain teeth is arranged on a driver of a hub via a spline-type interface. The teeth of each sprocket engage alternatingly with the chain upon actuation of the derailleur and transfer a torque from the pedaling forces of the rider to the driver via an inner profile that connects the sprockets to the driver splines. Each of these sprockets therefore individually transfers the torque to the driver, as a result of which each sprocket must be stronger and heavier both in the area of the profile of the sprocket and in the sprocket arms due to the lateral forces as a result of the usually misaligned chain.

To meet different requirements, for example in cycling, as designs become lighter and the demand for precision becomes greater in conjunction with a further increase in the number of gears, the basic approach of constructing multiple sprockets in a single piece was achieved.

For instance, such a multiple sprocket arrangement is known from EP 1 972 539 in which the sprockets are arranged in a conical support structure in which tubular sections and disc-shaped sections alternate in a stepped manner and teeth arranged on the periphery thereof are designed to engage with the roller chain. The support structure can be embodied with very thin walls, the minimum thickness of which is defined above all by the manufacturing tolerances.

In multiple sprocket arrangements comprised of individual sprockets, the individual sprockets are each non-rotatably connected to the driver. A torque-transferring profile, typically in the form of castellations or projections, is located on the inside of the each sprocket and creates a positive connection between the individual sprocket and the driver. Moreover, several adjacent individual sprockets can be joined together into a sprocket cluster by screwing them together with spacer rings positioned therebetween to ensure that a defined spacing is maintained in the axial direction between the individual sprockets. This makes it easier to mount a connected cluster of sprockets onto the driver, which is necessary in the event of tooth wear on the sprockets and permitting replacement with new sprockets. The smallest individual sprocket is given a special task to secure attachment of the cluster to the driver.

For the axial fixing of the sprocket cluster, an attachment screw is typically used which is screwed with its external thread into an internal thread on the driver. Tool surfaces on the attachment screw enable engagement of a tool on same in order to apply torque to the attachment screw to tighten or loosen it.

During pedaling operation, the driver and the sprocket cluster rotate under and through the chain, which engages on the sprocket at a constant angle of inclination, and the point of applied force of the tensile force of the chain on the sprocket cluster changes constantly at the interconnection of driver and sprocket.

The internal diameter of the sprocket cluster is greater than the external diameter of the driver so that it is possible to mount the sprocket cluster by pushing it axially onto the driver.

When the sprocket cluster undesirably rotates with respect to the driver, the sprocket cluster therefore rolls off on the outer circumferential surface of the driver (i.e., slippage) and, in doing so, tends to rotate about a lesser angle than the driver. As a result of the restricted rotation between sprocket cluster and driver through engaging projections on the sprocket cluster, a back-and-forth flexing movement of the sprocket cluster with respect to the driver occurs. This undesirable flexing movement can contribute to the loosening of the attachment screw, causing the attachment screw to come unscrewed, resulting in the loss of a secure connection between sprocket cluster and driver. As a countermeasure, knurled elements both on the attachment screw and on conventional smallest sprockets have proven expedient. The knurled elements are arranged with a radial extension in relation to the axis of rotation of the sprocket and engage each other as a result of the axial abutment between an abutment on the driver on the one hand and the head of the attachment screw on the other hand. If a flexing movement of the smallest sprocket now occurs with respect to the driver within the limits predetermined cooperating knurled elements, the attachment screw can no longer loosen. Rather, it moves together with the back-and-forth movement of the smallest sprocket during the abovementioned flexing movement, because the knurling prevents greater movement than that between the smallest sprocket and the attachment screw.

The individual knurled elements are aligned radially to inhibit loosening rotation between the smallest sprocket and the attachment screw. In the case of a smallest sprocket that is manufactured by means of punching and reshaping, the shaped elements are stamped in as well, for which purpose complementary shaping elements are present on the corresponding stamping tools. The production of the shaped elements occurs incidentally as part of the tool that forms the overall sprocket, as it were, without carrying out additional processing steps that might have a negative impact on manufacturing costs.

The situation is different with sprocket clusters that are produced by means of manufacturing methods involving machining. In that case, shaping work steps are first performed through lathe machining steps and subsequent milling operations in which the shaped elements of the knurled teeth cannot be produced in an incidental manner. Rather, other additional processing steps would have to be performed, with the associated additional processing times and costs. It is especially disadvantageous here that the shaped elements of the knurled teeth, due to their radial alignment, are not conducive to a milling operation, much less to lathe machining.

BRIEF SUMMARY OF THE INVENTION

The object is, therefore, for a sprocket assembly that is produced by means of manufacturing methods involving machining, to provide a cost-effective possibility for the provision of a rotationally secure connection between the attachment screw and the sprocket cluster. This object is achieved by dividing the sprocket cluster into at least two components, particularly a separate ring element in addition to the already-existing sprocket cluster. These two components are coupled together in a rotationally fixed manner by means of rotary coupling elements, with knurled teeth being embodied on one of the components that do not have to be formed by machining the sprocket cluster, but rather with the aid of cost-effective methods such as a stamping process.

The production of the above-mentioned knurled feature, which acts as rotary coupling elements, is associated with additional manufacturing costs. It has turned out, however, that these costs are lower compared to the production of the knurled teeth using machining manufacturing methods that are optimized in terms of the processing of the sprocket cluster. Alternatively, the knurled teeth may be provided on a component separate from the sprocket cluster using a machining process that is optimized for this component, permitting independent manufacture.

A fluting on a ring element for a sprocket for a bicycle is shown in FR 1 195 874.

Discs with collars having different alignments at a clamping point for a cable on a bicycle are disclosed in EP 0 766 014.

BRIEF DESCRIPTION OF THE SEVERAL VIEWS OF THE DRAWINGS

The invention is illustrated by way of example below based on the attached figures.

DETAILED DESCRIPTION OF THE INVENTION

Figure 1:
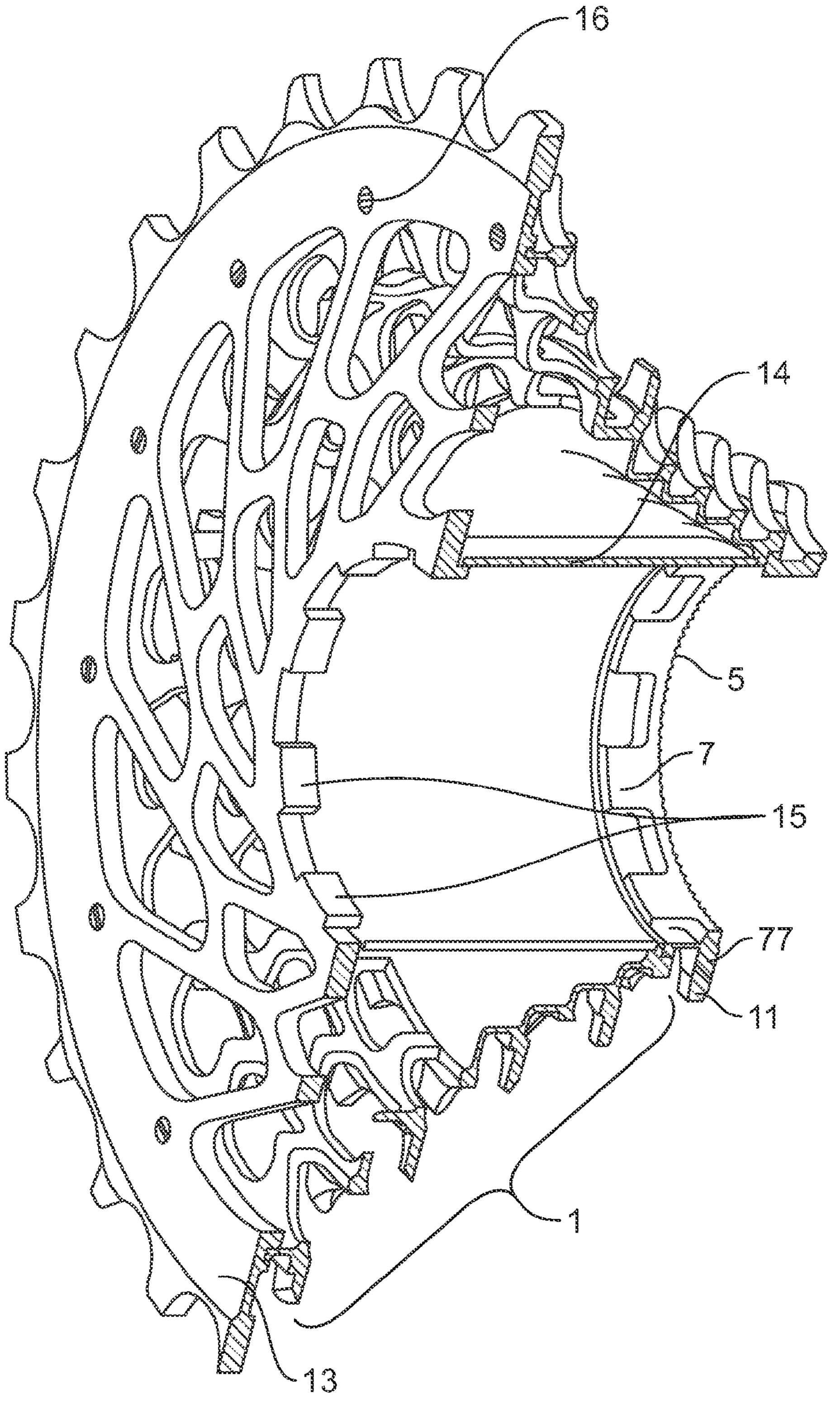
FIG. 1 is a prior art one-piece sprocket cluster that was produced by means of a machining manufacturing method.

FIG. 1 shows a prior art one-piece sprocket cluster 1, a cap member 13, a spacer sleeve 14 and a separate smallest sprocket 17, the cluster 1 installable on a driver (not shown) of a bicycle rear wheel hub in a rotatable manner with respect to the hub axle (also not shown). For the purpose of rotary coupling, engaging projections 15 engage on the cap member 13 and first rotation-couplers 7 engage on the smallest sprocket 17 into depressions provided on the driver. Also, for the purpose of rotary coupling, engaging pins 16 engage on the sprocket cluster 1 in corresponding holes on the cap member 13. By means of an attachment screw (not shown), which is arranged in the figure to the right of the smallest sprocket 17, the smallest sprocket, the sprocket cluster 1, the spacer sleeve 14 and the cap member 13 are pre-tensioned against an axial collar of the driver. As this occurs, a stepped support structure of the sprocket cluster 1 is slightly compressed axially until the spacer sleeve 14, after using up an axial clearance, comes to abut the smallest sprocket 17 and the cap member 13. The smallest sprocket 17 constitutes a ring element 2 with sprocket teeth 11 protruding radially outwardly and has a first knurled feature 5. The axial direction is shown at A (see FIG. 2).

During the process of shifting the drive chain from the smallest sprocket 17 to the adjacent larger individual sprocket on the sprocket cluster 1 for the purpose of switching gears, a defined correlation between the respective sprocket teeth 11 in terms of their relative angular position around the axis of rotation of the driver is important for the shifting process. This relative angular position is determined by how both the sprocket cluster 1 and the smallest sprocket 17 are oriented angularly to the driver with respect to each other. The advantage of a precise angular correlation such as that which exists between the individual sprockets on the sprocket cluster 1 does not exist here. In addition, the diameter of the smallest sprocket 17 and hence the number of teeth is given a lower limit by the external diameter of the driver.

Figure 2:
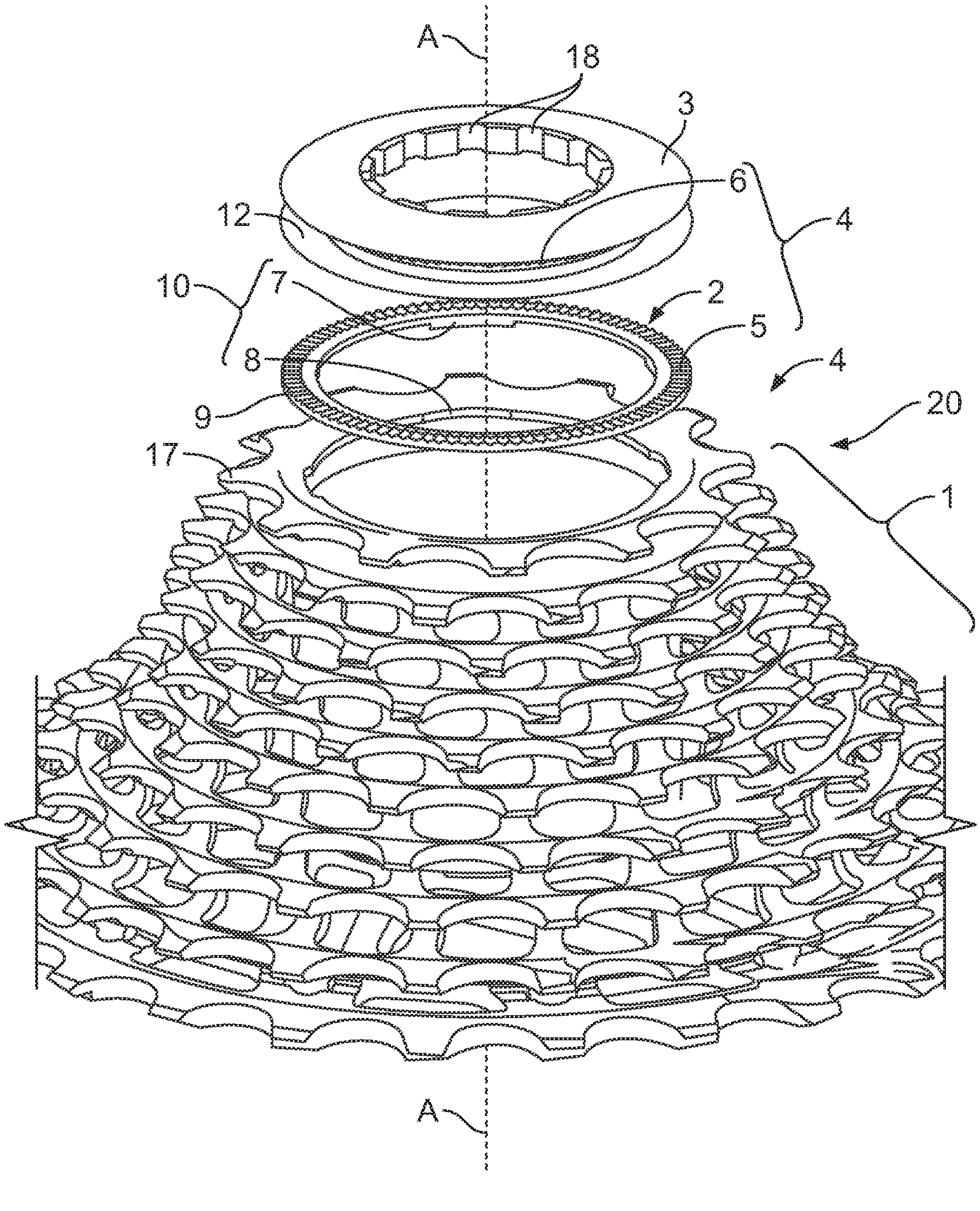
FIG. 2 is an inventive embodiment of a sprocket assembly in conjunction with a ring element with a knurled feature.

FIG. 2 shows a sprocket assembly 20 of a sprocket cluster 1, a ring element 2 and a threaded element 3 for mounting on the driver on a bicycle rear wheel hub. The sprocket cluster 1 is manufactured in a single piece by means of machining methods such as lathing and milling and also includes the smallest sprocket 17. The integration of the smallest sprocket 17 is especially advantageous because, as a result, even very small numbers of teeth can be realized. Otherwise, a small separate sprocket, particularly in the case of a very small number of teeth, constitutes a very delicate construction, because catch elements for the driver or other coupling elements have to be provided on the interior circumference which must correspond to the diameter of the driver. Eleven teeth therefore may constitute a limit of feasibility for common diameter ratios.

Through a threaded element 3 with a second knurled feature 6, the sprocket cluster 1 with the smallest sprocket 17 and the ring element 2 are subjected to an axial force and braced against each other. A first knurled feature 5 on the ring element 2 engages in the intermediate spaces between second knurled feature 6 on the threaded element 3 in order to prevent or inhibit rotational loosening of the threaded element 3. In the depicted sample embodiment, a spring washer 12 is also provided which is flexed in the axial direction according to the knurled features and reduces the locking effect of the knurled features 5, 6, which together form a knurled toothing 4. By virtue of the flexibility of the sprocket cluster 1 in the axial direction, the spring washer 12 can also be omitted. Tool surfaces 18 on the inner periphery of the threaded element 3 permit engagement of a tool.

The threaded element 3 is screwed with its external thread in the internal thread at the driver. With appropriate diameter ratios, an internal thread could also be provided on the threaded element 3 for screwing on an external thread at the driver.

Figure 3:
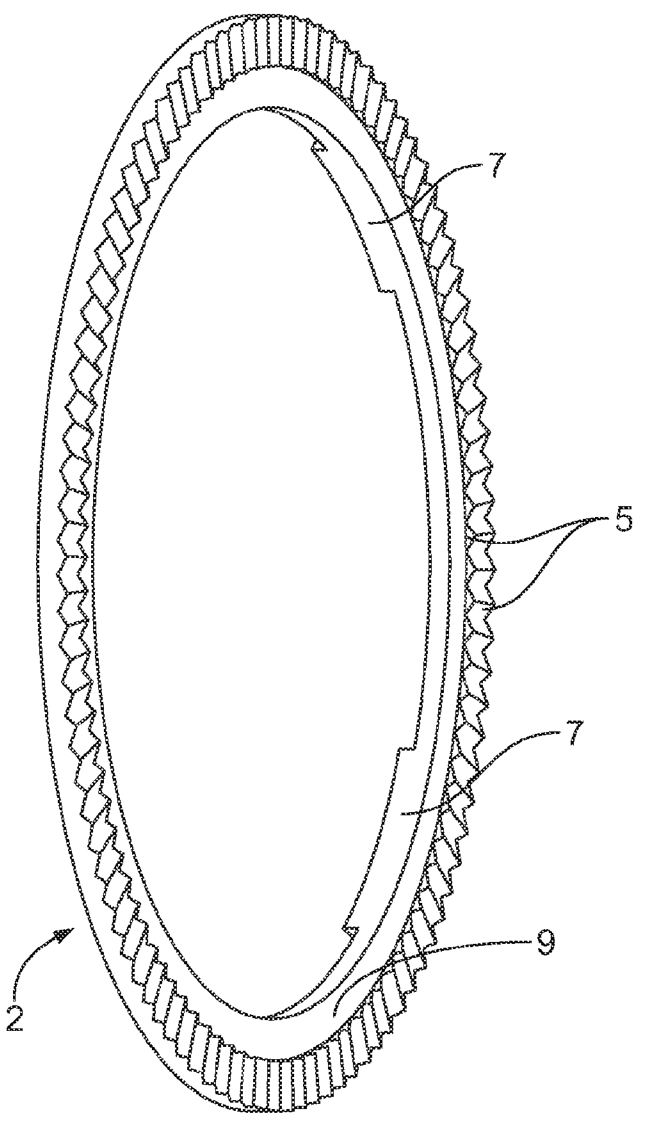
FIG. 3 is an embodiment of the inventive ring element with the knurled feature.
Figure 4:
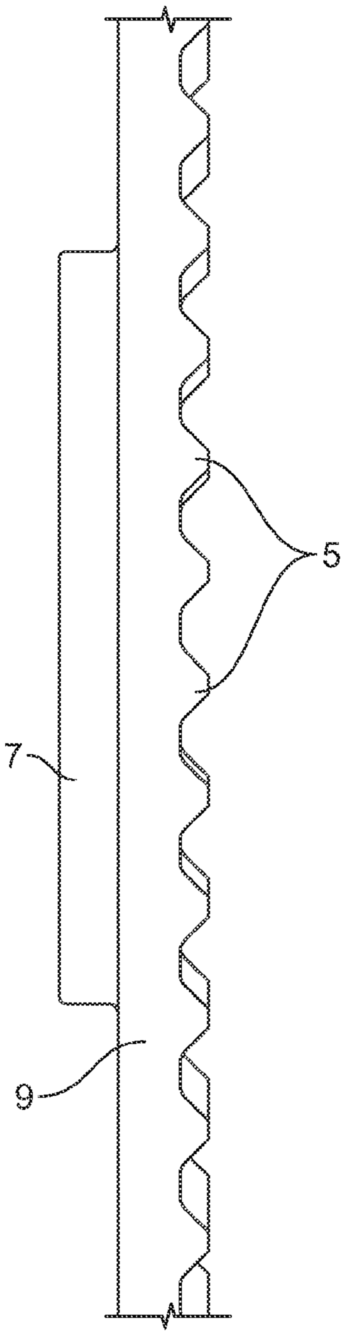
FIG. 4 is a detailed side view of an embodiment of the inventive ring element with the knurled feature.

FIG. 3 shows the complete ring element 2, and FIG. 4 shows details thereof. First rotation-couplers 7 protrude in the axial direction from a disc-shaped base 9. In the assembled state, they engage with second rotation-couplers 8 on the sprocket cluster 1 and prevent the rotation of the ring element 2 with respect to the sprocket cluster 1, which is necessary when tightening the attachment screw 3. The rotation-couplers 8, embodied as recesses in the sprocket cluster 1, are simple to include during the manufacture of the sprocket cluster 1. A conceivable alternative would also be protruding shaped elements.

The large number of knurled features 5 on the ring element 2, which knurled features 5 are intricate but should be manufactured with precision, makes it clear that a manufacturing method using machining is associated with great expense. According to an embodiment of the invention, this problem is solved through the provision of a separate, non-rotating ring element 2 for which other, more favorable manufacturing methods can be considered, such as punching and stamping. It has been found that, through the arrangement of first and second rotation-couplers 7, 8, together forming a rotation-coupling device 10, the additional expense is comparatively smaller.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A sprocket assembly for mounting on a driver of a rear-wheel hub of a bicycle, comprising:

a sprocket cluster;

a ring element having a first knurled feature, the ring element free of radially outwardly protruding teeth for the engagement of a roller chain;

a threaded element having a second knurled feature, the first and second knurled features sized and shaped to fit together, wherein the sprocket cluster and the ring element are braced against each other in an axial direction by the threaded element; and a rotation-coupling device provided between the ring element and the sprocket cluster, the rotation-coupling device including a first rotation-coupler on the ring element and of a second rotation-coupler on the sprocket cluster, which rotationally couples the ring element and the sprocket cluster.

2. The sprocket assembly of claim 1, wherein a smallest sprocket of the sprocket cluster is formed as a single piece with the sprocket cluster.

3. The sprocket assembly of claim 2, wherein the ring element has a disc-shaped base and the first rotation-coupler protrudes axially with respect to the disc-shaped base body.

4. The sprocket assembly of claim 1, wherein the sprocket cluster has a cap member.

5. The sprocket assembly of claim 1, wherein the sprocket cluster is a single-piece.

6. The sprocket assembly of claim 5, wherein a smallest sprocket is formed as a single piece with the sprocket cluster.

7. The sprocket assembly of claim 6, wherein the ring element has a disc-shaped base and the first rotation-coupler protrudes axially with respect to the disc-shaped base body.

8. The sprocket assembly of claim 5, wherein the ring element is a separate piece.

9. The sprocket assembly of claim 1, wherein the ring element is a separate piece.

* * * * *